J. A. COULTER.
HARVESTER-DROPPER.
No. 175,433. Patented March 28, 1876.
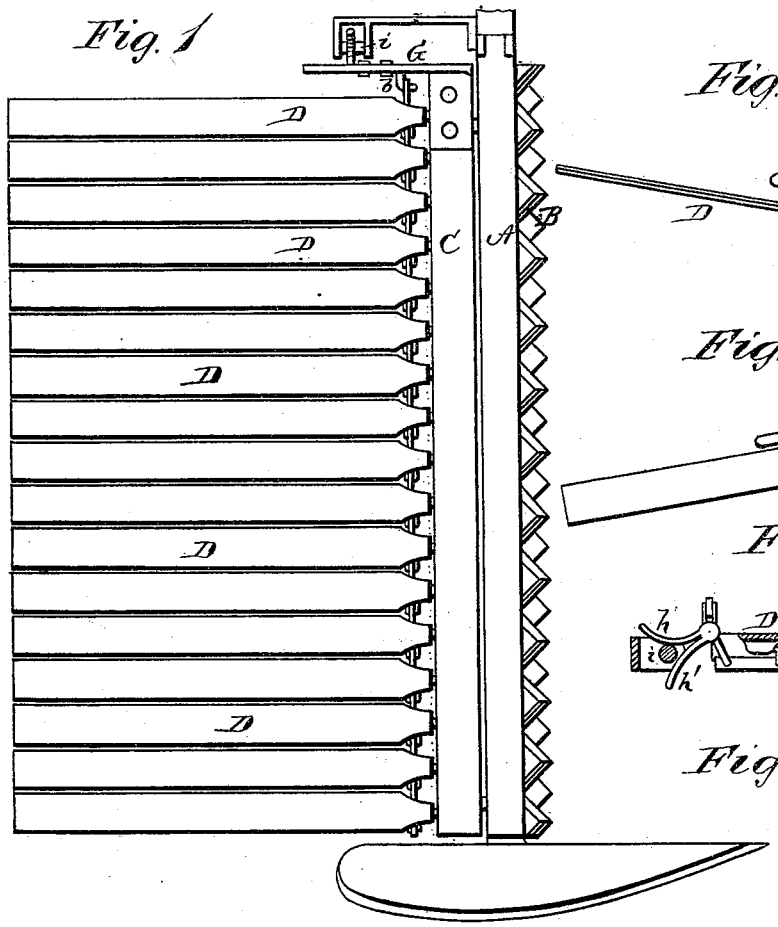
WITNESSES
INVENTOR

UNITED STATES PATENT OFFICE.

JOHN A. COULTER, OF PITTSFIELD, ILLINOIS.

IMPROVEMENT IN HARVESTER-DROPPERS.

Specification forming part of Letters Patent No. 175,433, dated March 28, 1876; application filed January 22, 1876.

*To all whom it may concern:*

Be it known that I, JOHN A. COULTER, of Pittsfield, in the county of Pike and State of Illinois, have invented a new and valuable Improvement in Harvester-Platforms; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my dropping-mechanism; and Figs. 2, 3, 4, 5, and 6 are detail views thereof.

My invention relates to harvester-platforms; and it consists in a platform for harvesters which is composed of a series of pivoted slats, which are turned flatwise to present a smooth surface while receiving the cut grain, and are turned edgewise when the grain is to be discharged, by means of mechanism, as hereinafter more fully set forth.

In the annexed drawings, A represents the finger-bar, and B the sickle, of a harvester constructed in any of the known and usual ways. The platform upon which the grain falls when cut is composed of a longitudinal bar, C, hinged to the rear of the finger-bar, and a series of slats, D, which are pivoted at their front ends to the rear edge of the bar C. The slats D are made thin their entire length, except immediately at their front ends, where they are made a little narrower, and sufficiently thick to admit of the pivots being fastened therein, and the slats are so arranged that when they are turned flat they are close together, forming, as it were, a platform without openings through it, upon which the grain falls when cut, thus preventing the scattering of any heads that would, with an open platform, fall through when the grain falls upon it. The slats D are connected, near their inner ends, to a bar, E, by links or staples a, which allow freedom of motion. The inner end of the bar E is attached to a crank, b, formed on one end of a shaft, d, which has its bearings in suitable loops or their equivalents, attached to a lever, G, secured on, and projecting from the inner end of the platform-bar C. This lever is to be operated by the driver at suitable intervals by means of a treadle or other suitable device connected to it, and arranged on the draft-frame. On the outer or rear end of the shaft d is a fork, h h', which straddles a roller, i, mounted on the side of the main frame of the harvester.

The operation is as follows: The platform is held elevated at a suitable angle to receive the grain as it is cut, and when in this position the slats D lie flat side by side, as above described. When a sufficient quantity of grain has been collected on the platform the driver, by means of the lever G and the devices connected thereto, allows the weight of the grain on the platform to depress it. During this downward movement of the platform the prong h, striking the roller i, turns the shaft d, which, by means of the crank b and connecting-rod E, turns the slats D about their pivots, so that when the platform is at its lowest point the slats are presented edgewise to the stubble, allowing the latter to project up between them, and drag off the grain from the platform. In the act of raising the platform again the slats are closed by the prong h' striking the roller i, and turning the shaft d back again to its former position.

I am aware that the slats of a dropper have heretofore been constructed and arranged in such a manner that they may be partially revolved, and I therefore lay no claim to such invention irrespective of the particular means employed by me to produce that result.

What I claim as new, and desire to secure by Letters Patent, is—

The bar C, hinged to the finger-bar, and provided with the pivoted slats D, in combination with the bar E, connected with said slats by the links a, hand-lever G, shaft d, crank b, forks h h, and roller i, all constructed and arranged substantially as described, and for the purpose set forth.

In testimony that I claim the above I have hereunto subscribed my name in the presence of two witnesses.

JOHN A. COULTER.

Witnesses:
 EUGENE W. JOHNSON,
 JOS. B. LOOMIS.